Dec. 12, 1961 N. A. LEIBREICH 3,012,483
HEADING MACHINE FOR CLOSING THE ENDS OF TUBE LENGTHS
Filed Aug. 4, 1958 9 Sheets-Sheet 3
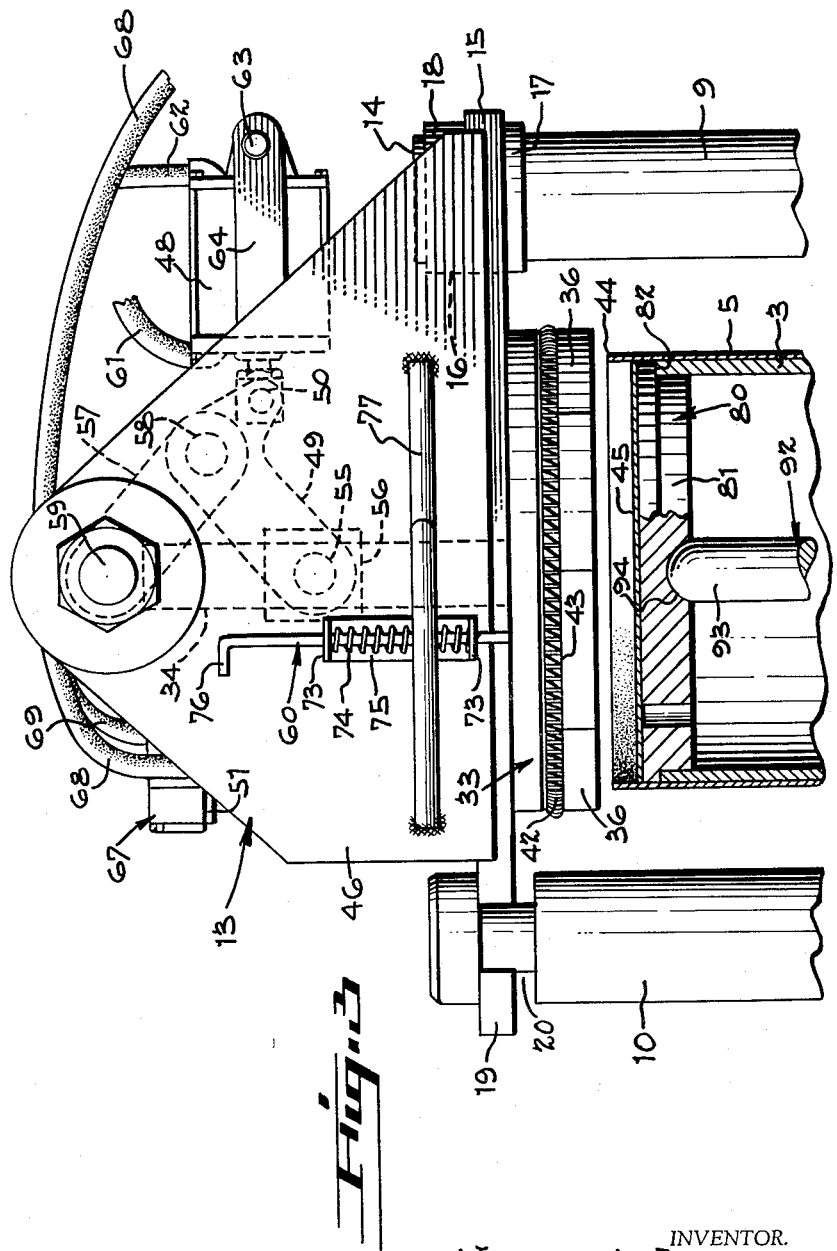
INVENTOR.
NORMAN A. LEIBREICH.
BY
DES JARDINS, ROBINSON, TRITLE & SCHENK.
HIS ATTORNEYS.

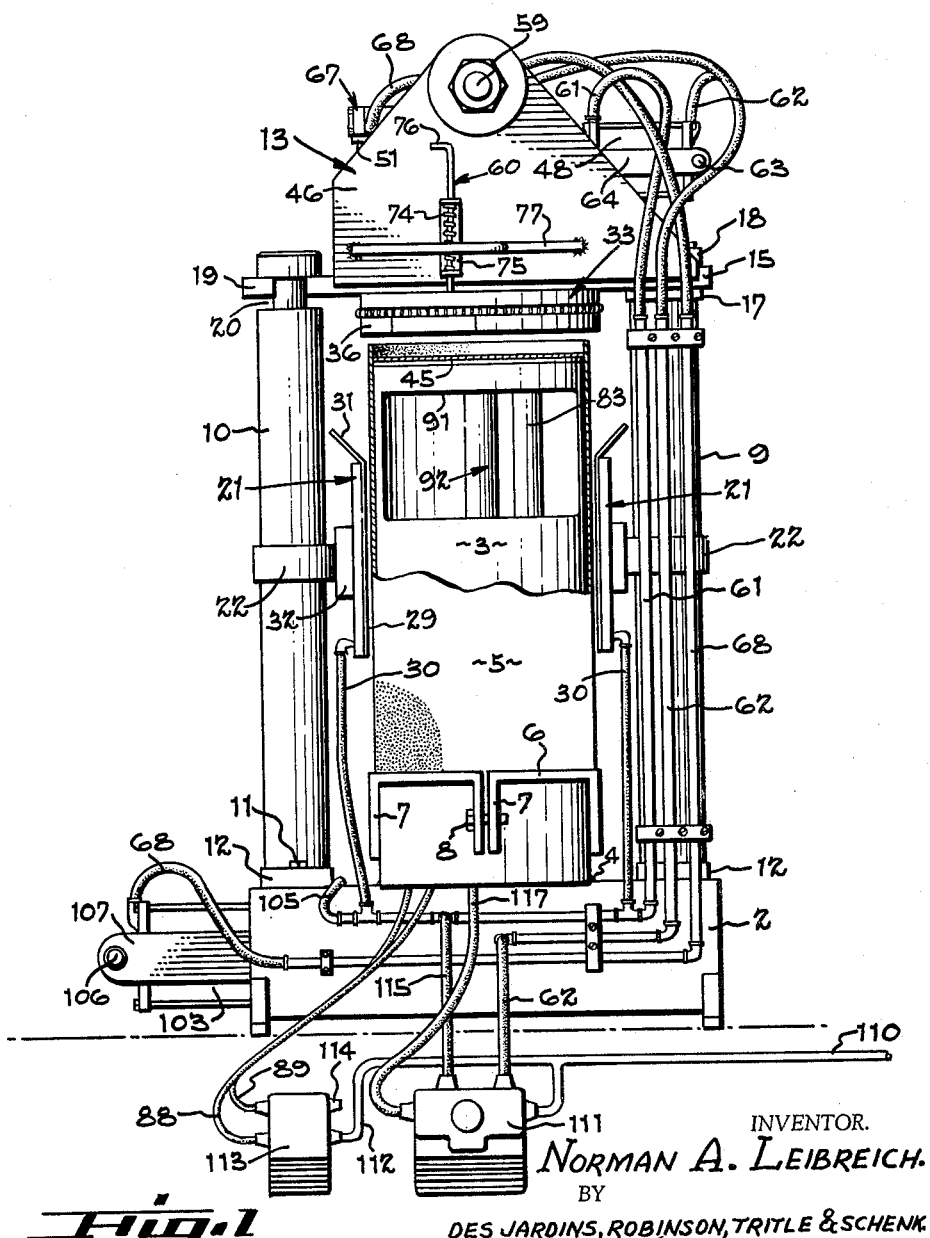

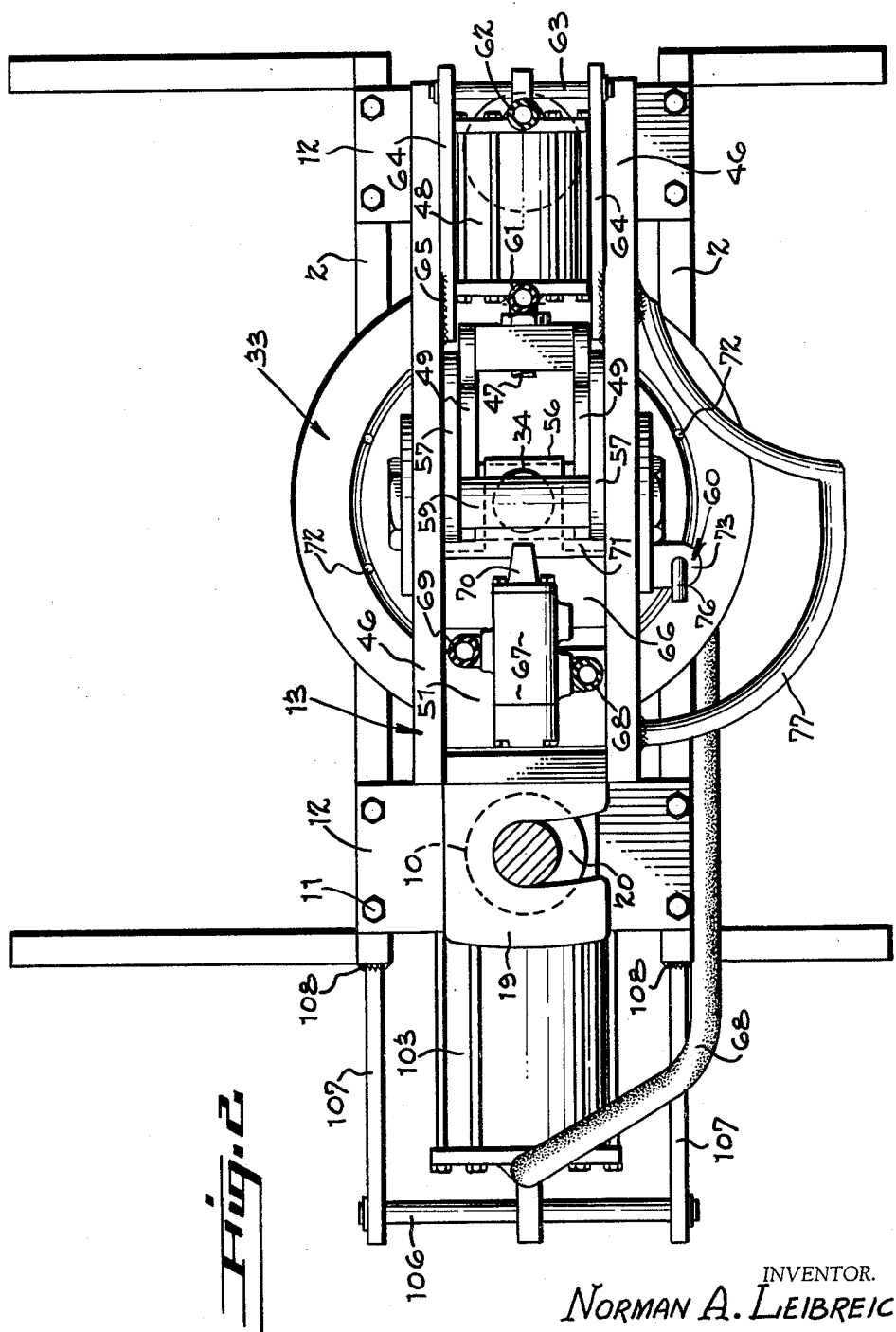

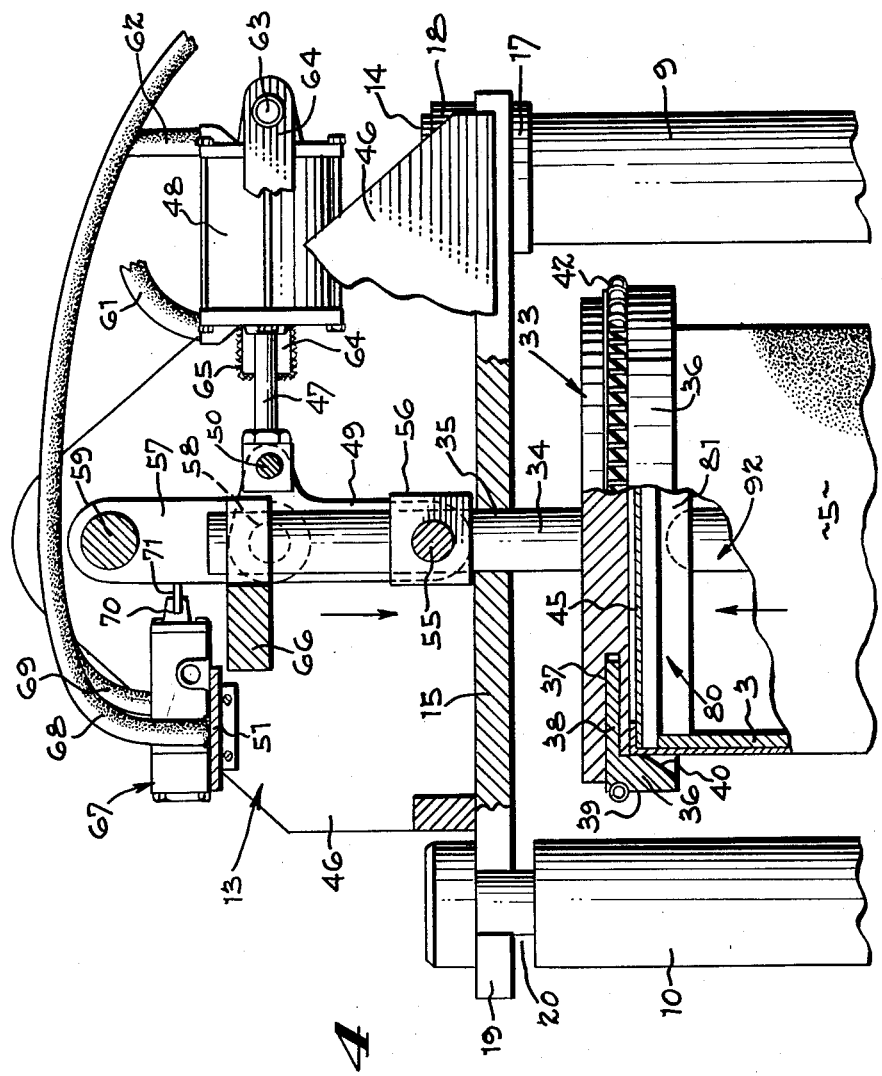

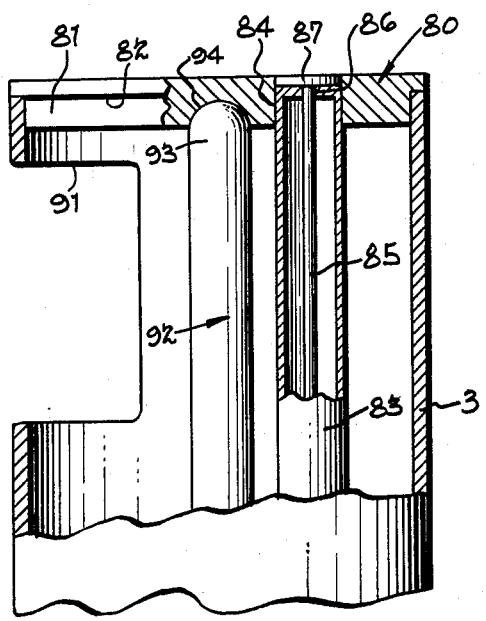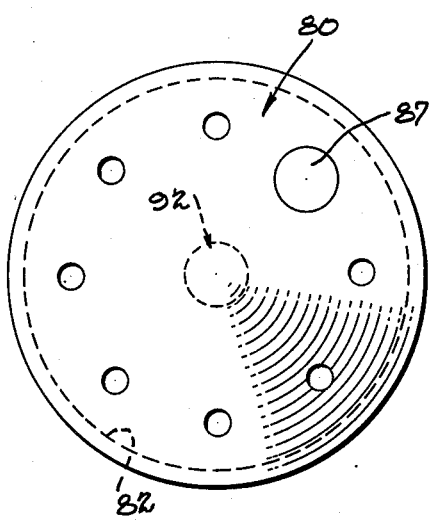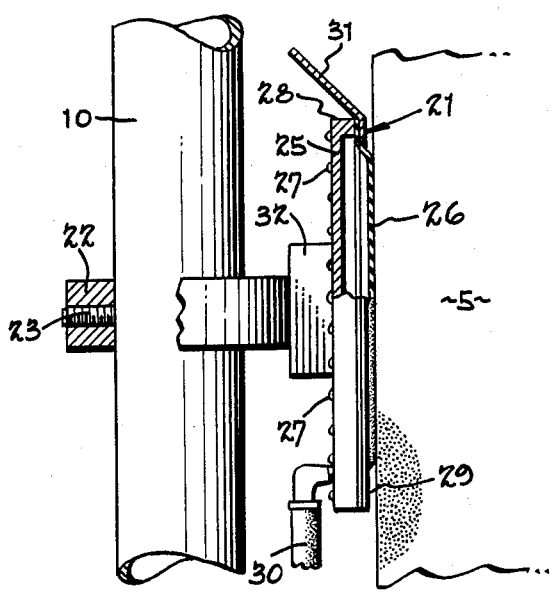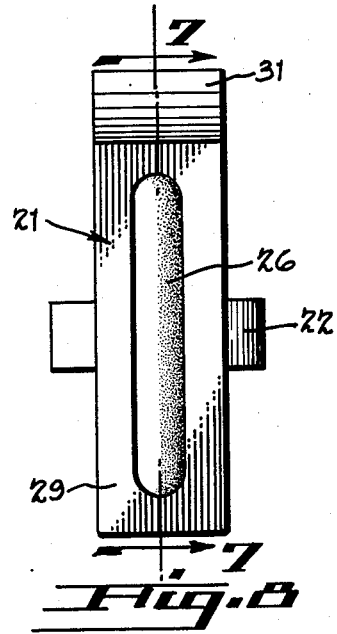
INVENTOR.
NORMAN A. LEIBREICH.
BY
DES JARDINS, ROBINSON, TRITTLE & SCHENK.
HIS ATTORNEYS.

Dec. 12, 1961 N. A. LEIBREICH 3,012,483
HEADING MACHINE FOR CLOSING THE ENDS OF TUBE LENGTHS
Filed Aug. 4, 1958 9 Sheets-Sheet 6

INVENTOR.
NORMAN A. LEIBREICH.
BY
DES JARDINS, ROBINSON, TRITLE & SCHENK.
HIS ATTORNEYS.

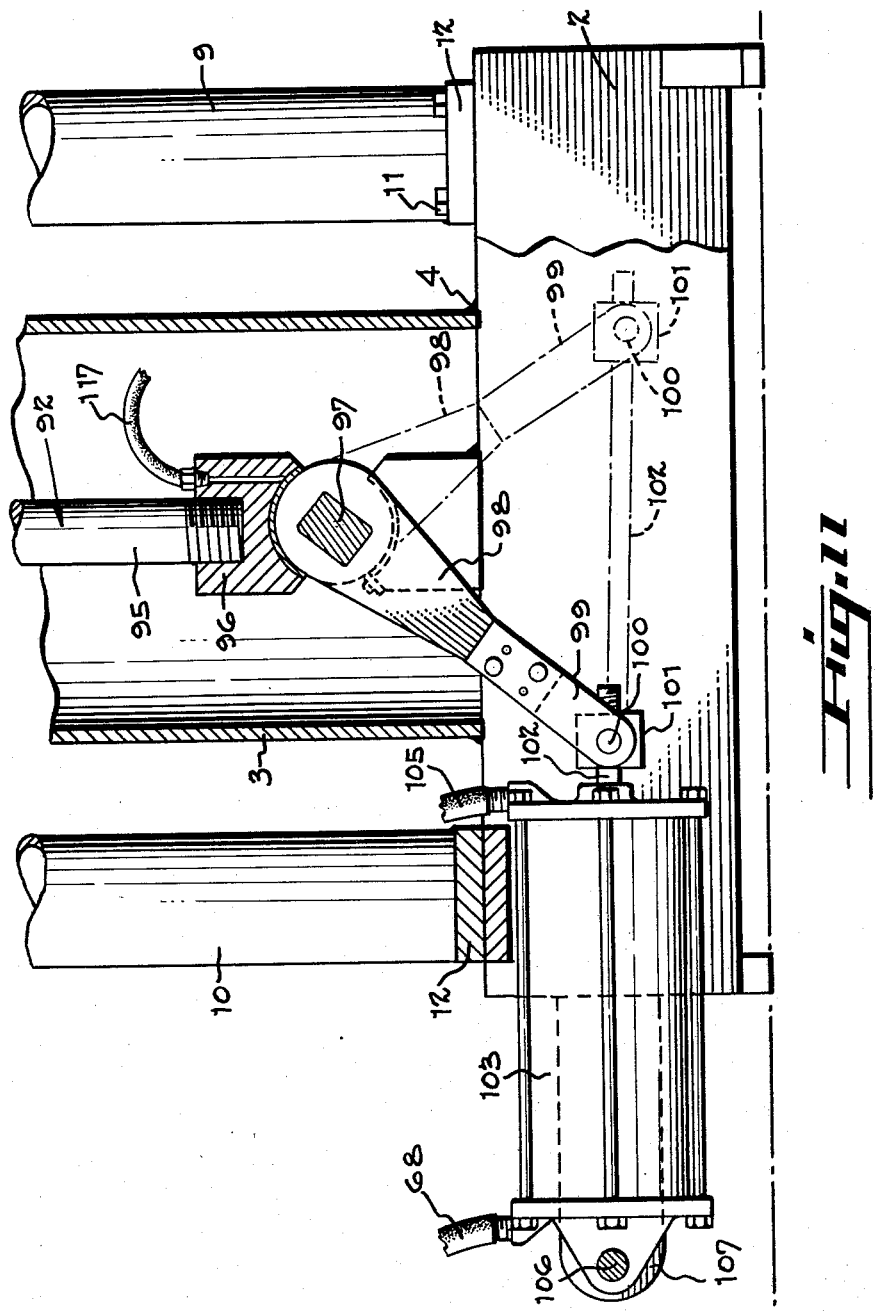

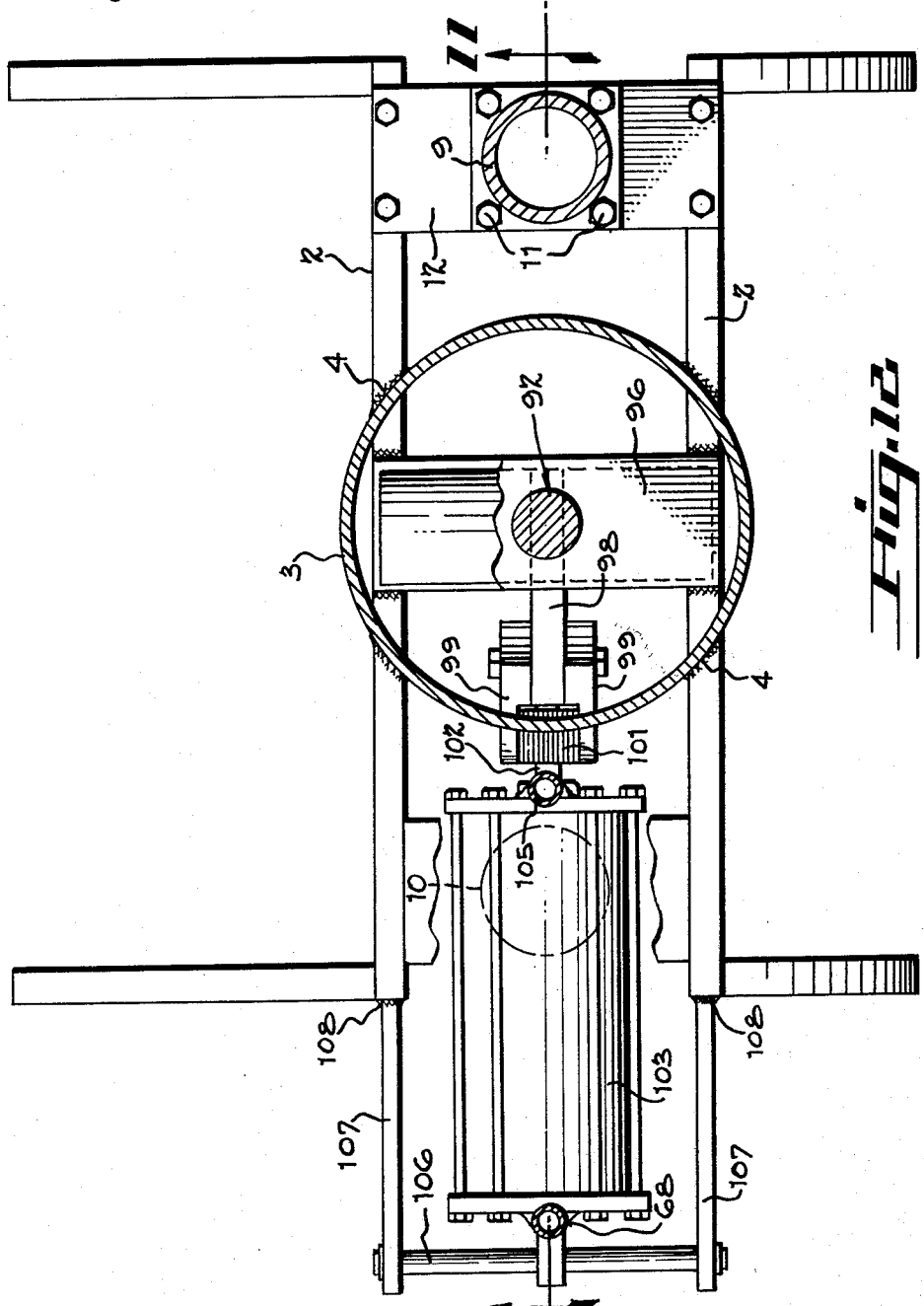

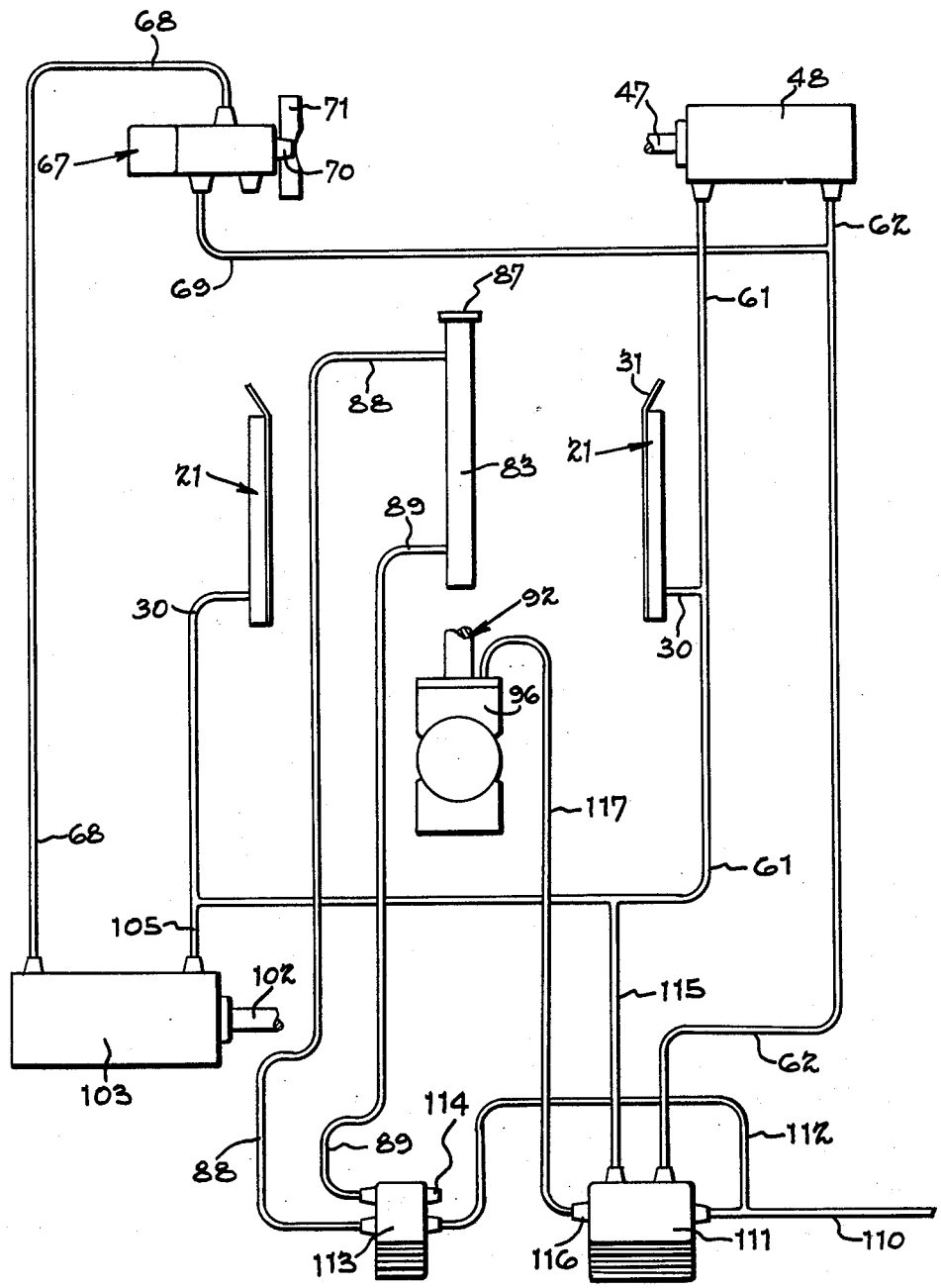

United States Patent Office 3,012,483
Patented Dec. 12, 1961

3,012,483
HEADING MACHINE FOR CLOSING THE ENDS OF TUBE LENGTHS
Norman Andrew Leibreich, Cincinnati, Ohio, assignor, by mesne assignments, to The Meade Corporation, a corporation of Ohio
Filed Aug. 4, 1958, Ser. No. 752,990
12 Claims. (Cl. 93—55.1)

This invention relates to a heading machine for closing the ends of tube lengths for forming paperboard containers, and it particularly pertains to a machine for fitting a closure disc within one end of a tubular length and spaced from said end, to provide a projecting end wall that is overturned radially inwardly for forming a surrounding marginal lap over the peripheral edge of said closure disc and a portion of the exposed surface and secured thereto by any suitable means.

This application is a continuation-in-part of my earlier application Serial No. 714,263 filed February 10, 1958, which issued as Patent No. 2,966,833, granted Jan. 3, 1961, and incorporated in full as part of the present disclosure. It has especially to do with means within the tubular length for exerting upward pressure against the underside of the insert disc in opposition to downward pressure exerted against the upper side of said disc.

The invention particularly pertains to a heading machine for fitting the bottom closure of paper board drum containers which are commonly used for packaging plastic materials, such as rubber, asphalt and like compositions that are poured into the containers in a hot molten condition to be solidified therein upon being cooled. The interior of the drum is lined with suitable material to make it resistant to impregnation and absorption of the contents within said container.

Heretofore, the inturned marginal end wall of the tubular drum has been formed with a series of tabs set off by intervening notches, preferably V-shaped, so that when the resulting V-shaped tabs are bent inwardly, their adjacent side edges will not lap but will either be spaced apart or in abutting relation. It is preferable to have the V-notches of such size that the adjacent side edges of the tabs will be in abutting relation, thereby forming over the marginal edge of the disc closure a lap which is continuous and of uniform thickness. However, these drum containers are made with many different forms of tabs, and the aim of the present invention is to have a machine such that is adapted for fitting the end closure within the end of the tubular length and heading the end of said length irrespective of the form of the end tabs on the tubular length or whether or not any end tabs whatever be provided thereon. The machine is adapted to fit the end closure within the tubular length and lap the projecting end wall of said tubular length over the end closure whether the inturned end wall be provided with or without a tab formation. The fold is made and subjected to sufficient pressure to press it down to a unifrom thickness. The machine is also adapted for heading tubular lengths of any length and of any type end formation. An adhesive is preferably used for securing the lap end to the end closure, and pressure is maintained until the adhesive is dried or set.

Accordingly, one of the main objects of the invention is a drum container heading machine which is simple in construction and efficient in operation.

Another object of the invention is a drum container header which is adapted for different drum container constructions.

Another object of the invention is a drum container header which is entirely automatic in operation except for inserting the tubular length in the machine and inserting the end closure therein.

Another object of the invention is a machine for applying extreme pressure to the closure head.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claims, and a structure constituting one preferred embodiment thereof is illustrated in the accompanying drawings, forming a part of this specification, in which:

FIG. 1 is a side elevation of one embodiment of a machine embodying the invention.

FIG. 2 is a top plan view of the machine with the pivoted head inclosed position.

FIG. 3 is a side elevation of the head of the machine.

FIG. 4 is a side elevation, similar to FIG. 3, partly in vertical cross section.

FIG. 5 is a side elevation of the top end of the cylindrical form, partly vertical cross section.

FIG. 6 is a plan view of the top end of the cylindrical form.

FIG. 7 is a view on line 7—7 of FIG. 8, looking into the direction of the arrows.

FIG. 8 is a detailed view of one of the grips mounted on one of the posts adjacent one side of the cylindrical form.

FIG. 11 is a side elevation, partly in cross section, of the bottom of the machine on line 11—11 of FIG. 12.

FIG. 12 is a top view of FIG. 11.

FIG. 13 is a diagrammatic view of a device for exerting upward pressure against the underside of the pressure head and its operating mechanism.

Figure 9:
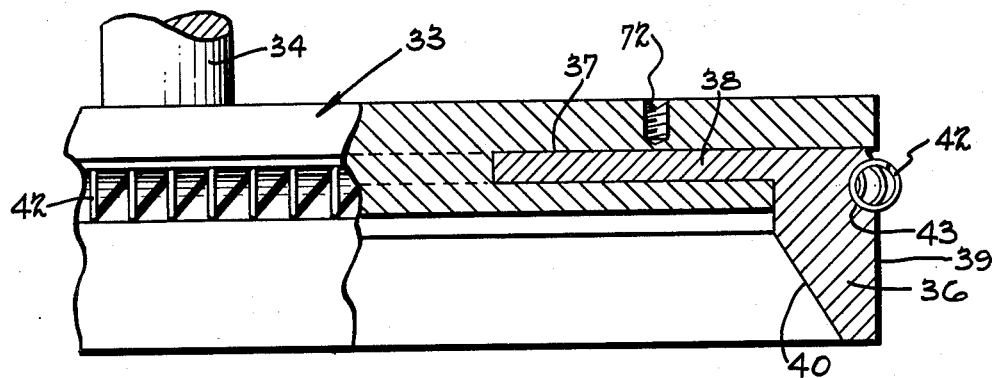
FIG. 9 is a cross section on line 9—9 of FIG. 10.
Figure 10:
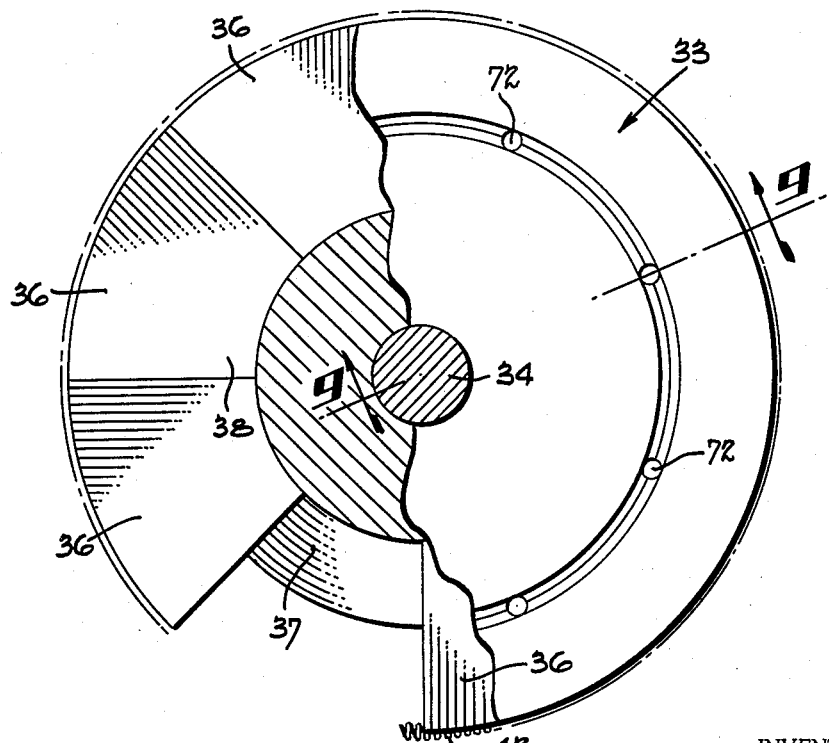
FIG. 10 is a top plan view of the presser head with parts broken away.

Referring specifically to the drawings in which like numerals designate like parts, numeral 2 is a metal base on which is mounted a cylindrical tubular form 3, its bottom end being fastened thereto by suitable means, such as welding 4. The cylindrical tubular form is of a height somewhat in excess of the length of any tubular length work object 5 which is to be headed at one end by the heading machine. Detachably mounted on the outside wall of the form 3, near its bottom end, is a split or sectional band or ring 6, with downwardly extending projections 7, which is vertically adjustable to any desired elevation and clamped to the form 3 in any conventional manner. Said ring is preferably split or sectional having flanged adjacent ends which may be clamped in a conventional manner, such as clamp bolts 8 extending through the flanges or adjacent terminal projections 7. This ring or band 6 serves as an abutment shoulder or seat against which the bottom edge of a tubular length work object 5 rests when placed on the form 3 for its top end to be closed or headed.

At the opposite sides of the form 3, and spaced therefrom, are a pair of vertical posts 9 and 10, one on each side, which are bolted to the base 2 by bolts 11 extending through webs 12. These posts 9 and 10 are somewhat longer than the form 3 to extend above its top end for pivotally mounting on one post 9 a swing-away unit 13 which is swiveled to and from latching position with the other post 10. This swing-away unit 13 is pivoted to the top end 14 of the post 9 by a plate 15 having a perforation 16 in one end to receive the top end 14 of the post 9, said perforated end portion being secured on said post between an annular shoulder 17 and a clamp nut 18. The opposite end of this plate 15 is provided with a hook ear 19 which is adapted to engage within a groove 20 formed near the top end of post 10.

A grip shoe 21 (FIGS. 1, 7 and 8) is adjustably mounted on each of the posts 9 and 10 by a ring 22 fitted to the post and clamped by a set screw 23. Each clamp shoe 21 is of identical construction comprising a back support 25 to which is clamped a flexible diaphragm or grip strip 26 by means of bolts 27 extending through a flanged edge 28, formed on one face of the back support, and a clamp plate 29 to provide a chamber or pocket between said back support and diaphragm. Compressed air is fed through the conduit 30 to the chamber or pocket for expanding the diaphragm 26 against the wall of the tubular length work object 5 when placed on the form 3. The clamp plate 29 has an outwardly flared top ear 31. These grip shoes may be of any construction. The ring 22 is fixed to an embossment 32 mounted on the rear side of the back support 25.

The swing-away unit 13 has a vertically movable presser member 33 mounted thereon by means of an arm or rod 34 projecting through a recess 35 in the plate 15, said presser member being cup-shaped and comprising a plurality of radially slidable segments 36 within an annular groove 37 formed in said member 33. These segments 36 have a shank portion 38 from which projects a downwardly extending arcuate rim 39 having a chamfered inside edge 40. An expansible band, in the form of a coiled wire spring 42, is disposed circumferentially about the outside wall of the rim portion 39, seated within a groove 43 formed in each of said segments. This spring 42 is under tension to bias the segments 36 to retracted or non-expanded position (FIGS. 3, 4, and 9). The chamfered inside edges 40 of the segments 36 contact the outside edge of the end 44 of the tubular length work object 5 on the form 3 and forces said end 44 inwardly and downwardly over a disc 45 which has been first inserted within the end of the tubular length work object as shown in FIG. 1. The angle of the chamfer is disposed at the most effective desired angle for first bending the end 44 of the work object inwardly and then downwardly after the inturning thereof has been completed so as to prevent wrinkling.

The swing-away unit 13 has mounted thereon mechanism connected to the presser member 33 for actuating same and means for mounting said mechanism on said unit. The mounting means comprises a housing member fixed to the plate 15 having two spaced-apart upwardly extending side walls 46 between which are mounted linked levers connecting the end of a piston 47, within the cylinder 48, to a wrist pin 50. The linked levers comprise a pair of ball crank levers 49 pivoted at one end to the wrist pin 50, and pivoted at their opposite ends to a wrist pin 55 on a collar 56 fixed to the rod 34. The ends of another pair of levers 57 are pivoted at 58 to the ball crank levers 49, and their opposite ends are pivoted to a wrist pin 59 mounted on the side walls 46. These linked levers are such as to exert maximum force against the presser member 33. The piston-cylinder unit has conduits 61 and 62 connected to the fluid pressure line, and the end of said piston-cylinder unit, opposite the lever connection, is swiveled to a wrist pin 63 extending between auxiliary support plates 64 that are fastened to the side walls 46, as by welding at 65. These is also a cross bar 66 between the side walls 46 so positioned for the levers 57 to abut thereagainst when moved from their dotted line position shown in FIG. 3 to be vertically aligned as shown in FIG. 4.

A supplementary piston-cylinder unit 67 is also mounted on the side walls 46 and connected to the hydraulic line by conduits 68 and 69. The ends of the piston 70 of said unit 67 is provided with a cross piece 71 for abutting against the levers 57 when they are vertically aligned with links 49. This cross piece 71 is a sensing device for causing the unit 67 to then operate another lever unit hereinafter described. This supplementary unit 67 is mounted on a support 51 fixed between the walls 46—46.

A latch bar 60 is mounted on the side of one of the side walls 46 in vertical position having its lower end adapted to fit in one of a series of holes 72 circumferentially disposed on the top side of the presser member 33. This latch bar 60 extends through recesses in the flanged ends 73 of a bracket 75 welded to the side wall 46, and a coiled spring 74 is interposed between said flanged ends 73 with its bottom end pinned to the latch bar 60 for biasing it downwardly. The top distal end of the latch bar has a handle 76 to permit it to be manually lifted from the holes 72 against the biasing means.

A handle 77 is advantageously fixed to one side of one of the side walls 46 for facilitating swinging the swing-away unit 13 to and from operating position. This may be of any form and in position to be accessible to the operator.

The cylindrical tubular form 3 has a top head 80 fitted thereto by means of an annular groove 81 cut out from the bottom corner to result in a shoulder 82 against which the top end of the tubular form 3 fits. This head 80 is detached from the form 3 so that it may be moved vertically relatively to said form. However, the depth of the groove 81 is such that the head will be held in position during vertical sliding movement. The range of vertical movement of the head relative to the form to exert upward pressure against the underside of the insert disc is relatively slight.

There is also mounted within the form 3 (FIGS. 5 and 13) a small cylindrical tube 83, its top end being fitted within a recess 84 in the head 80. Within this tube 83 is slidably mounted a rod 85 projecting through a recess 86 in the top end of the said tube and having a flat head 87. The bottom end of this tube 83 is closed, and it is connected to the hydraulic air line by conduits 88 and 89. The rod 85 is vertically reciprocable, and is for the purpose of ejecting the drum 5 from the form 3 after the closure disc has been fitted thereto. Some air is permitted to escape through the recess 86 which will also assist in ejecting the drum from the form. A side wall portion is advantageously removed from the form 3, near its top end, to provide a recess 91 just below the head 80 to facilitate placing the tubular length work object 5 on the form and removing the completed drum therefrom. This recess 91 permits the tubular length being tilted at an angle when placed on and removed from the form, rather than being required to be in a vertical position.

A rod 92 (FIG. 11) has its top end 93 seated within a central socket 94, formed in the bottom side of the head 80. The bottom end 95 of the rod 92 is screw-fitted to connector member 96 to which is pivoted, by pin 97, the end of a lever 98 whose opposite end 99 is pivoted at 100 to a connector 101 adjustably fitted on the end of a piston rod 102 which projects from a piston within the cylinder 103. The cylinder 103 is connected at one end to a conduit 68 leading to the sensing device 67 and at the opposite end to a conduit 105 which is connected to conduits 30 from the clamps 21. Conduit 105 is connected directly to one of the conduits 30 and to the other by conduit 61. This cylinder is swiveled to a wrist pin 106 extending between two support plates which are fastened by welding 108 to the metal base 2.

A fluid conduit (FIG. 13) 110 is connected to a foot pedal operated cylinder 111, and a branch conduit 112 is connected to another foot pedal cylinder 113 that is connected to the tube 83 by conduits 88 and 89 and has an exhaust port 114. The cylinder 111 is connected to conduit 62, leading directly to cylinder 48, and to a branch conduit 115 leading to conduit 61. Another conduit 117 connects cylinder 111 to a port in the connector member 96 for lubricating the pivot of the lever which is connected thereto. Said cylinder 111 is provided with an exhaust port 116.

From the foregoing description of the novel construction and the function of the component parts, its operation is obvious. A cylindrical tube 5 is placed on the form 3 with its top end projecting above the top end of said form. A closure disc 45 is inserted, as shown in FIG. 3, to rest on the top end of the form. The foot pedal of member 111 is depressed to start a cycle of operation in which the presser member 33 is lowered to the position shown in FIG. 4, and the head 80 of said form is pressed upwardly, opposing the downward thrust of the presser member 71 when the lever units 49 and 57 are in the position shown. When this pressing operation is completed, the presser member and the head of the form are returned to inoperative position, as are the clamps 21 which have also been operated in the cycle of operation. Thereafter, foot pedal 113 is depressed to operate the rod 85 for ejecting the headed work object so that it can be readily lifted from the form by the operator.

It will be understood that there may be various changes in details of construction without departing from the spirit of the invention, and, therefore, I claim the invention broadly as indicated by the appended claims.

Having thus described by invention, what I claim as new and useful and desire to secure by United States Letters Patent, is:

1. A machine for heading tubular drums comprising a hollow form for supporting a tubular length work object, a vertically slidable horizontally disposed head in the top of said form for supporting a drum-closure disc thereon, a lever mechanism for operating said slidable head, a vertically movable header for bending inwardly the projecting end of the work object, said header comprising a disc-like body having a downwardly facing horizontally disposed peripheral surface for pressing the inturned projecting end of said work object downwardly against said drum-closure disc and a series of radially movable segments having inwardly and downwardly facing conical surfaces for engaging and bending inwardly said upwardly projecting work object end and having radially disposed guide portions slidably engaging cooperating guide portions of said disc-like body, means for yieldably pressing said segments inwardly, a lever mechanism for operating the header, and a sensing means for the first lever mechanism disposed to be actuated by the second lever mechanism.

2. The heading machine of claim 1 in which the form is provided with means for ejecting the finished work object.

3. The heading machine of claim 2 in which said ejecting means is hydraulically operated.

4. The heading machine of claim 1 including hydraulically operated means disposed on opposite sides of the form for clamping against the work object.

5. The heading machine of claim 1 in which a portion of the side wall of the form, adjacent its top end, is removed for permitting the work object being placed on and removed from the form at an angle to the vertical.

6. The heading machine of claim 1 in which each lever mechanism comprises a plurality of levers pivoted together.

7. The heading machine of claim 1 including means mounted on the exterior of the form for supporting the bottom end of the work object.

8. The heading machine of claim 7 in which the supporting means is vertically adjustable.

9. A machine for heading tubular drums comprising a hollow form for supporting a tubular length work object, a horizontally swingable unit for being moved in and out of position over the form, a vertical axis thrust bearing support for swingably mounting said unit, means diametrically opposite said support engageable by said unit and constructed and arranged to stop said unit in operation position and to resist upward forces exerted thereagainst during heading operations, a presser member vertically slidably mounted on said swingable unit, lever mechanism for operating said presser member, a vertically movable head for said form, lever mechanism for operating said head, reciprocating means mounted in the head for ejecting the work object, and means for operating said reciprocating means.

10. The machine of claim 9 having hydraulic means for operating the operable units, and footpedal means for controlling the hydraulic means.

11. The machine of claim 9 including sensing means actuated by one lever mechanism for operation of the other lever mechanism.

12. The machine of claim 11 in which the sensing means is actuated by the lever mechanism for the presser member for actuating the lever mechanism of the vertically movable head of the form.

References Cited in the file of this patent

UNITED STATES PATENTS

| 1,401,132 | Bond | Dec. 27, 1921 |
| 2,444,515 | La Bombard | July 6, 1948 |
| 2,541,905 | Amberg | Feb. 13, 1951 |
| 2,584,718 | Laabs | Feb. 5, 1952 |
| 2,671,490 | Jansen | Mar. 9, 1954 |
| 2,696,239 | Harris | Dec. 7, 1954 |
| 2,778,865 | Kongsgaarden | Jan. 22, 1957 |
| 2,789,482 | Burman | Apr. 23, 1957 |
| 2,865,265 | Sherman | Dec. 23, 1958 |

FOREIGN PATENTS

| 54,237 | Switzerland | Sept. 27, 1910 |

UNITED STATES PATENT OFFICE
CERTIFICATE OF CORRECTION

Patent No. 3,012,483                        December 12, 1961

Norman Andrew Leibreich

It is hereby certified that error appears in the above numbered patent requiring correction and that the said Letters Patent should read as corrected below.

In the grant, lines 2 and 12, and in the heading to the printed specification, line 5, for "The Meade Corporation", each occurrence, read -- The Mead Corporation --.

Signed and sealed this 24th day of April 1962.

(SEAL)
Attest:

ESTON G. JOHNSON
Attesting Officer

DAVID L. LADD
Commissioner of Patents